(12) United States Patent
Soni

(10) Patent No.: US 8,737,398 B2
(45) Date of Patent: May 27, 2014

(54) COMMUNICATION MODULE WITH NETWORK ISOLATION AND COMMUNICATION FILTER

(75) Inventor: Vijaykumar Soni, Westford, MA (US)

(73) Assignee: Schneider Electric USA, Inc., Palatine, IL (US)

( * ) Notice: Subject to any disclaimer, the term of this patent is extended or adjusted under 35 U.S.C. 154(b) by 610 days.

(21) Appl. No.: 12/347,320

(22) Filed: Dec. 31, 2008

(65) Prior Publication Data

US 2010/0165878 A1 Jul. 1, 2010

(51) Int. Cl.
*H04L 12/28* (2006.01)

(52) U.S. Cl.
USPC .......................... 370/392; 370/235; 709/246

(58) Field of Classification Search
USPC ............. 370/419, 401, 256, 395.1, 392, 389, 370/390, 469, 395.62, 400; 709/246, 223, 709/217
See application file for complete search history.

(56) References Cited

U.S. PATENT DOCUMENTS

| | | | |
|---|---|---|---|
| 6,321,272 B1 | 11/2001 | Swales | |
| 7,246,156 B2 | 7/2007 | Ginter et al. | |
| 7,860,874 B2 * | 12/2010 | Karklins et al. | 707/758 |
| 7,990,967 B2 * | 8/2011 | Brandt et al. | 370/392 |
| 8,321,653 B2 * | 11/2012 | McNutt et al. | 713/1 |
| 8,417,847 B2 * | 4/2013 | McNutt et al. | 710/30 |
| 2004/0215976 A1 * | 10/2004 | Jain | 713/201 |
| 2005/0143850 A1 | 6/2005 | Pavlik et al. | |
| 2006/0182118 A1 * | 8/2006 | Lam et al. | 370/395.42 |
| 2007/0186011 A1 * | 8/2007 | Batke et al. | 709/246 |
| 2007/0199061 A1 | 8/2007 | Byres et al. | |

FOREIGN PATENT DOCUMENTS

| | | |
|---|---|---|
| WO | 9913388 A1 | 3/1999 |
| WO | 2007075099 A1 | 7/2007 |

OTHER PUBLICATIONS

Industrial Defender, Industrial Defender NIDS, Nov. 8, 2007, p. 1, Retrieved online from: <http://www.industrialdefender.com/offering/nids.php>.
Industrial Defender, Corporate Overview, 2007, pp. 1-8, Retrieved online from : <http://www.industrialdefender.com>.
WAGO Corporation, WAGO 750-871 Dual-Port Ethernet Controller Integrates Ethernet Switch into PLC, Oct. 22, 2008, p. 1, Retrieved online from: <http://www.wago.us/news/24329.htm.
International Search Report for PCT/US2009/069779, dated Mar. 4, 2010, pp. 1-4.

* cited by examiner

*Primary Examiner* — Michael J Moore, Jr.
(74) *Attorney, Agent, or Firm* — Banner & Witcoff, Ltd.

(57) ABSTRACT

Aspects of the invention provide apparatuses, systems, and computer readable media for protecting a programmable logic controller (PLC) 201 and plant network 203 against unauthorized access and for providing robust intended communication. A communication module 211 provides only intended communication and blocks all unintended communication between the plant network and a control network/office network 205 without using external infrastructure network devices. The communication module includes an Ethernet switch 303 and ports that electrically couple the CPU module 209, a plant network, and control/office network and controls communication to the PLC and the plant network from the control/office network by forwarding packets based on configuration information 406 and 504, where the packets are received through the ports. The communication module passes packets only when the associated source address and destination address are in accordance with the configuration information. The communication module may further pass packets based on packet traffic limits.

12 Claims, 6 Drawing Sheets

COMMUNICATION MODULE WITH NETWORK ISOLATION AND COMMUNICATION FILTER

BACKGROUND

Ethernet technology is widely used in the resident, office and industrial sectors. As Ethernet network and information technology becomes more popular and more mature, the trend is to use Ethernet technology as a major communications interface in many industrial communications and automation applications. Because the process control industry and the automation industry have recognized the significance of Ethernet/TCP/IP, the Ethernet network protocol is becoming a dominant communication technology at the process level and control level.

Many manufacturers of programmable logic controllers (PLCs) and distributed control systems (DCSs) produce products that incorporate a built-in Ethernet interface, which can are used to connect PLCs, Ethernet I/O, and other industrial instruments. Consequently, Ethernet technology has migrated from non-critical office environments to the critical but less predictable industrial environments. However, traditional off-the-shelf Ethernet equipment typically cannot meet high reliability requirements of industrial applications.

The industrial network may thus be susceptible to both internal and external cyber-attacks and non-intentional actions that still disrupt the performance/operation of the system. As a preventive measure from external cyber-attacks, firewalls or other security measures may be taken to separate the industrial network from other networks. However, the industrial network is still vulnerable since such security measures are not foolproof in the prevention of external attacks by viruses, worms, Trojans and other forms of malicious code as well as computer hacking, intrusions, insider attacks, errors, and omissions may occur. Additionally, an infected PC or system, for example, can bypass the firewall by connecting to the industrial network using a modem, direct connection, or by a virtual private network (VPN). The PC or system may then introduce worms or other forms of malicious code into the industrial network. Moreover, a PC or system may be connected directly to the network behind the firewall. All of the above-mentioned scenarios may cause degraded performance or may create communication failures in industrial automation environments. While a communication failure in an office environment could merely create a minor inconvenience, even a short communication failure in an industrial environment may create a safety hazard and tremendous loss in investment.

In addition, PLC (Programmable logic Control), input/output devices, HMI (Human Machine Interface), DCS (Distributed Control System), Supervisory Control and Data Acquisition (SCADA), and automation control equipment often used in the management of critical industrial systems such as electricity generation and distribution, oil production, transportation, manufacturing and health services have become increasingly interconnected through the use of popular communications technologies such as Ethernet, TCP/IP and web services. While the networking of SCADA and automation control equipment has brought considerable benefit in the form of improved information flows and efficiency, it has also exposed these systems to the possibility of attack from viruses, hackers and terrorists as once isolated devices and networks become accessible from around the world. There may be numerous poorly protected control devices spanning the globe. These devices may be charged with the safe operation of critical systems and infrastructure such as power transmission substations, gas pipelines, manufacturing plants and the like, yet at the same time remain largely unprotected from malicious persons who may target them for attack.

In addition to security concerns, a control system is vulnerable to non-intentional actions that may disrupt the performance/operation of the system. For example, a device legitimately connected to the control system may inundate the network with messages to another device in the control system. Consequently, other devices in the control system that have time-critical communication requirements may be adversely affected.

One approach to resolving the above issues, in accordance with prior art, is to monitor events of the industrial network and accordingly raise alerts. The industrial network may perform a threat assessment and respond in accordance with the threat assessment. A wide variety of conditions relating to performance, health and security information about the industrial network as well as other factors reflecting conditions external to the industrial network may be taken into account. However, the monitoring of alarms is an alert capability that can be used to trigger actions to prevent access but, by itself, does not prevent access.

Traditional security solutions are also based on central firewalls protecting unsecured internal devices or computers from the outside world. However this approach often does not address the requirements of the industrial controls world. Existing controllers typically do not offer authentication, integrity or confidentiality mechanisms and can be completely controlled by any individual that can find or "ping" the network and the associated devices. In addition, traditional security solutions typically cannot be easily patched nor have security features added to them. Once a virus or hacker manages to get past (or is already inside) the traditional firewall, the devices protected by the firewall, such as a typical programmable logic controller (PLC) or distributed control system (DCS) is an easy target for attack.

SUMMARY

An aspect of the invention provides apparatuses and computer-readable media for protecting a programmable logic controller (PLC) and plant network against unauthorized access and for providing robust intended communication. An Ethernet communication interface module design protects plant network and provides only intended communication and blocks all unintended communication between a plant network and a control network/office network without using external infrastructure network devices in an industrial automation field.

With another aspect of the invention, a communication module in a programmable logic controller (PLC) includes an Ethernet switch and ports that electrically couple the CPU module, a plant network, and control/office network. The module controls communication to the PLC and the plant network from the control/office network by passing packets based on configuration information, where the packets are received through the ports and the Ethernet switch. The communication module passes packets only when the associated source address and destination address are in accordance with the configuration information. The communication module may further pass packets based on packet traffic limits.

With another aspect of the invention, a communication module filters packets based on a criterion that utilizes the source address, the destination address and an application identification (application protocol). Filtering may occur at layer 2 or layer 3 of the Open Systems Interconnection (OSI)

Basic Reference Model. When the criterion is satisfied, packets are forwarded to the destination address.

BRIEF DESCRIPTION OF THE DRAWINGS

A more complete understanding of the present invention and the advantages thereof may be acquired by referring to the following description in consideration of the accompanying drawings, in which like reference numbers indicate like features and wherein.

DETAILED DESCRIPTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
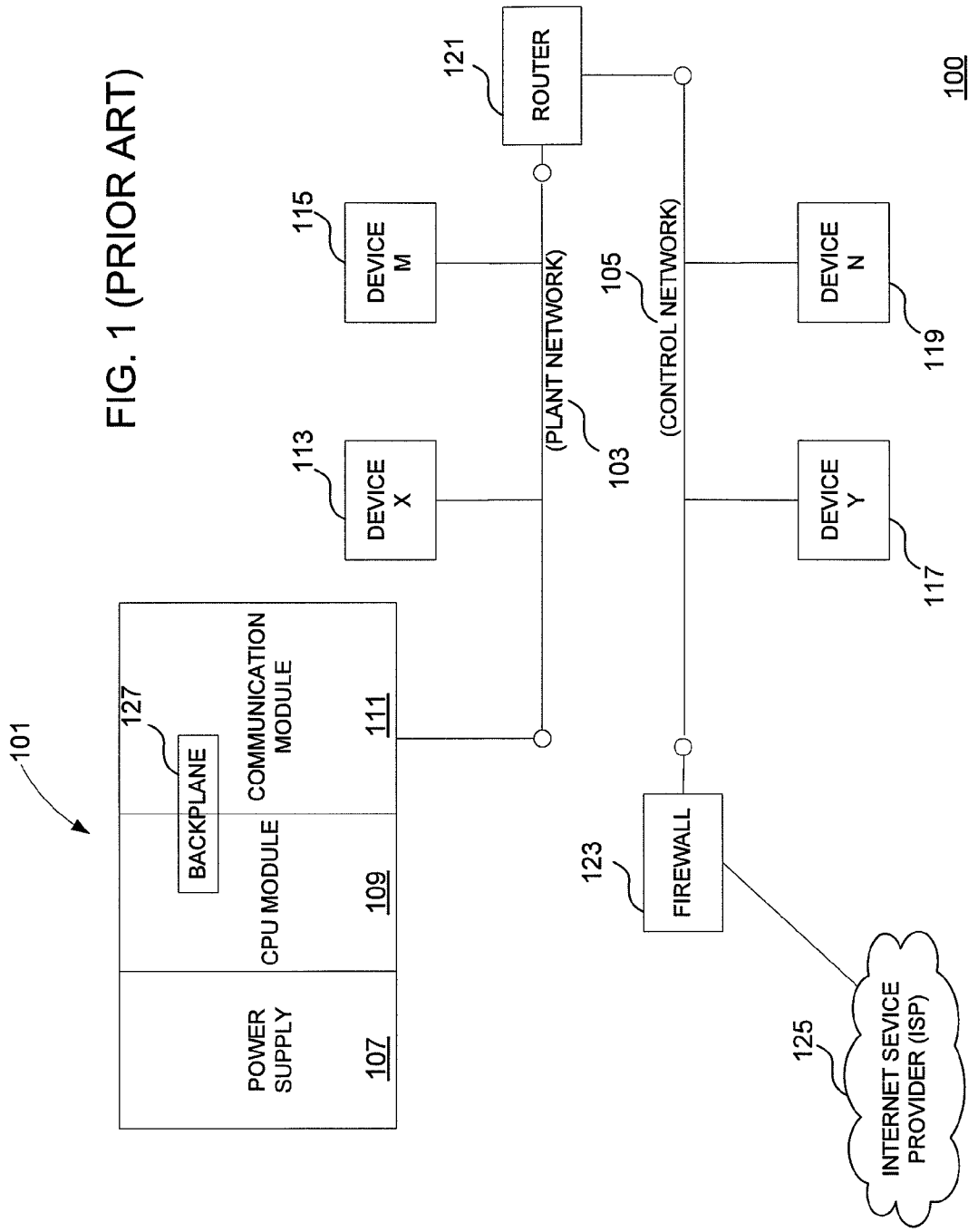
FIG. 1 shows a control system according to prior art.

FIG. 1 shows control system 100 according to prior art. Programmable logic controller (PLC) 101 often controls an automated process in an industrial environment and includes communication module 111, CPU module 109, power supply 107 and backplane 127. Communication module 111 provides a communication interface between PLC 101 and plant network 103 and control network 105 (through router 121). Plant network 103 provides network connectivity for plant devices 113 and 115 and is associated with the direct operation of automation operation by communicating with PLC 101 by receiving output information and sending input information. Backplane 127 provides communication between a special function module, e.g., communication module 111, and CPU module 111. Power supply 107 supplies electrical power to CPU module 109 and communication module 111 through backplane 127.

Control network 105 connects control/office devices 117 and 119, which are typically responsible for monitoring, configuration, and supervisory controls. Control/office devices 117 and 119 do not typically participate in the automation operation but monitor plant activities. Also, control network 105 connects to Internet service provide (ISP) 125 through firewall 123.

The network typology of system 100 often does not isolate control network 105 from plant network 103 and PLC 101. Consequently, the processing of an inordinate number of messages to and from control 105 may disrupt an automated process that is supported by PLC 101 and plant network 103.

Figure 2:
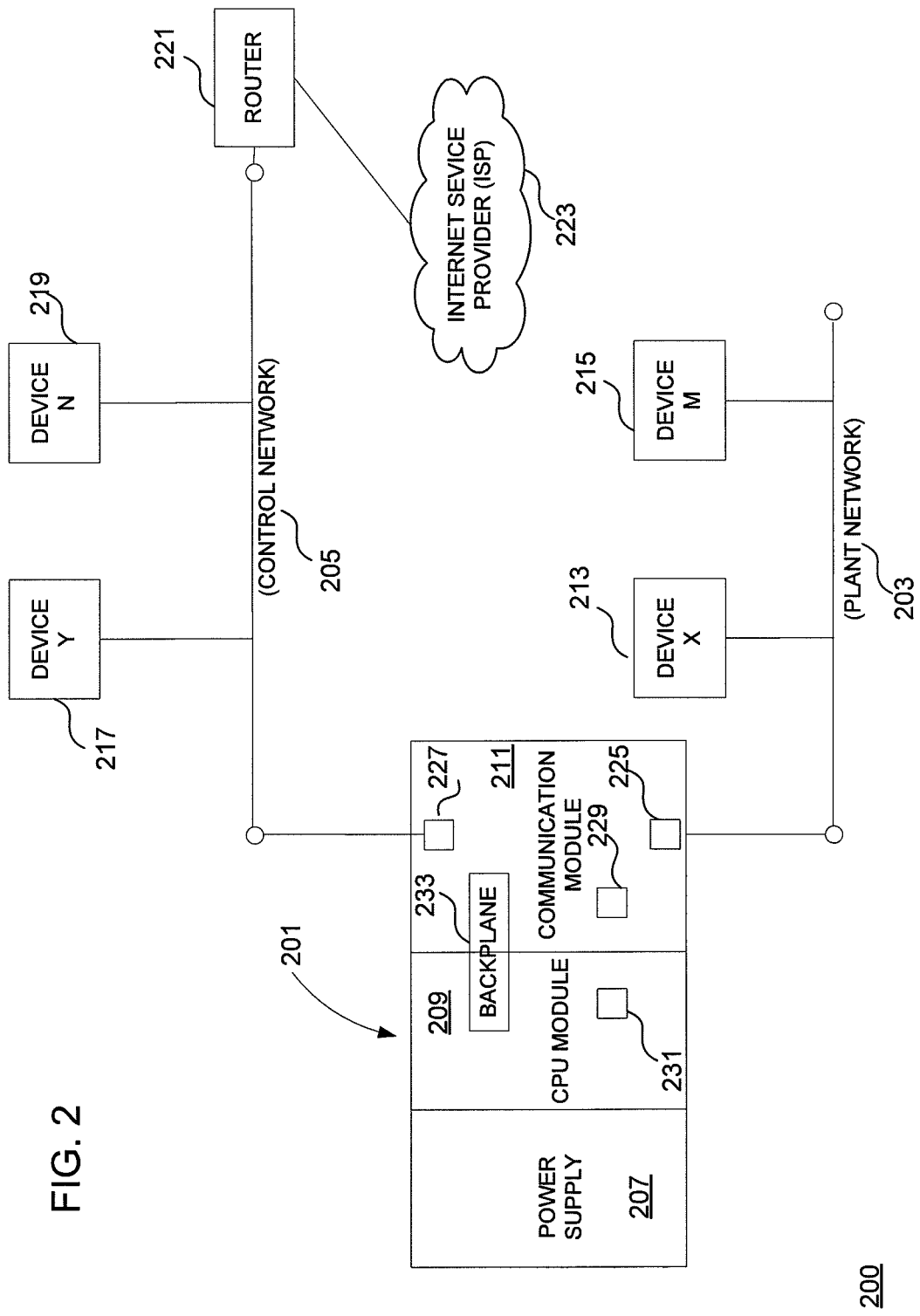
FIG. 2 shows a control system according to an embodiment of the invention.

FIG. 2 shows control system 200 according to an embodiment of the invention. A programmable logic controller (PLC) Ethernet communication interface module design protects PLC 201 and plant network 203 against unauthorized access and provides robust intended communication. The Ethernet communication interface module design protects plant network 203 and provides only intended communication and blocks all unintended communication between plant network 203 and control network/office network 205 without using external infrastructure network devices typically incorporated in traditional industrial automation systems.

Programmable logic controller (PLC) 201 includes power supply 207, CPU module 209, and special purpose interface modules (e.g., communication module 211). Power supply 207 supplies electrical power to CPU module 209 and communication module 211 using backplane 233. Additionally, backplane 233 supports communication between CPU module 209 and special function modules.

Special function modules offer specific functions to the CPU module 209. Examples include a digital input module, digital output module, analog input module, analog output module, EtherNet/IP interface module, and Ethernet interface module.

Plant network 203 provides a network topology that supports communication between plant devices 213 and 215 and PLC 201. A plant device is typically a device that participates directly or indirectly in the decision making process of an automation operation and that is typically responsible for automation operation. Devices 213 and 215 communicate with PLC 201 and receive output information and send input information for automation operation.

Example of plant devices 213 and 215 include configuration engineering tools (CET), human machine interfaces (HMI), input devices, output devices, remote input/output devices, remote PLC, and other fieldbus gateways. The flow of the data between CPU module 209 and plant network devices is typically time critical as these devices are participating in the industrial automation operation.

Control network 205 provides communication for control/office devices 217 and 219 in order to monitor, configure, and perform supervisory control of system 200. Devices 217 and 219 typically do not participate in the automation operation directly but monitor plant activities. Devices 217 and 219 may also communicate with PLC 201. Examples of control devices include (but not limited to) supervisory controls and data acquisition (SCADA), plant monitor station, maintenance station, inventory system, account station and Internet server. Communication between control network 205 and PLC 201 is typically not as time critical as communication between plant network 203 and PLC 201.

As will be further discussed, communication module 211 supports different Ethernet ports for communication between control/office devices 217 and 219 (corresponding to port 227), plant devices 213 and 215 (corresponding to port 225) and CPU module 209 (corresponding to ports 229 and 231). In addition, communication from some services may be supported between communication module 211 and CPU module 209 through backplane 233. Also, although FIG. 2 depicts only two control/office devices and two plant devices, embodiments of the invention typically support more than two devices on each network.

Figure 3:
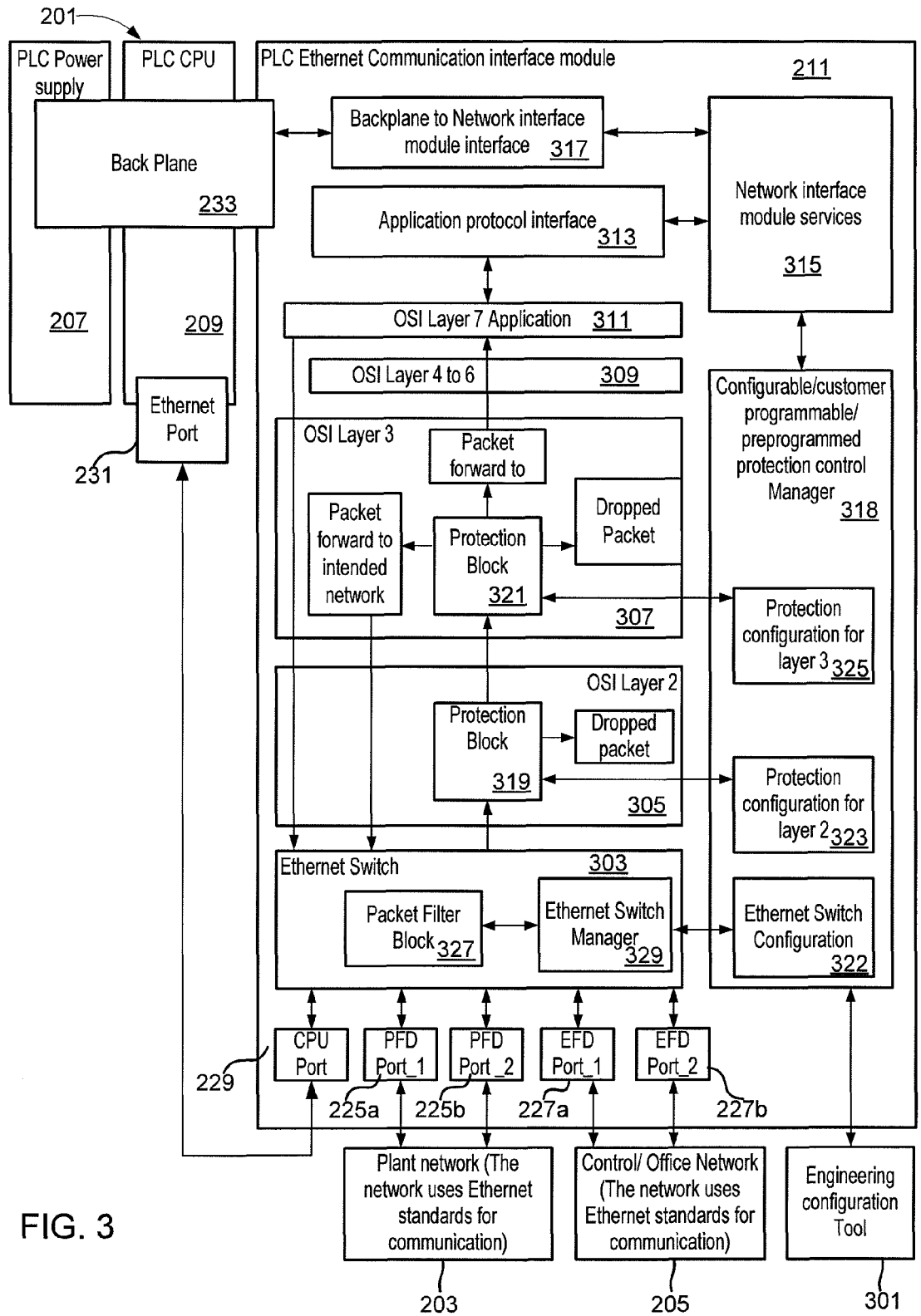
FIG. 3 shows a block diagram of a programmable logic controller according to an embodiment of the invention.

FIG. 3 shows a block diagram of programmable logic controller 201 according to an embodiment of the invention. PLC 201 includes Ethernet communication interface component 211 comprising Ethernet switch 303, OSI layer 2 component 305, OSI layer 3 component 307, OSI layer 4 to 6 component 309, OSI layer 7 application component 311, application protocol interface (API) 313, communication interface module services component 315, backplane 233, backplane interface 317, and protection control manager 318.

The Open Systems Interconnection Basic Reference Model (OSI Reference Model or OSI Model) is an abstract description for layered communications and computer network protocol design. The OSI Reference Model divides network architecture into seven layers which, from top to bottom, are the Application (Layer 7), Presentation (Layer 6), Session (Layer 5), Transport (Layer 4), Network (Layer 3), Data-Link (Layer 2), and Physical (Layer 1) layers. A layer is a collection of conceptually similar functions that provide services to the layer above it and receives service from the layer below it. For example, a layer that provides error-free communications across a network provides the path needed by applications above it, while it calls the next lower layer to send and receive packets that make up the contents of the path.

Module 211 performs filtering of the packet flow for network protection by processing the packet flow at different layers. First, a packet arrives at Ethernet port 225a, 225b, 227a, 227b, or 229 and is stored in the memory of switch 303. Switch filter 327 subsequently receives the packet from the switch memory. Packet filter block 327 identifies the packet and forwards or drops the packet as configured. Layer 2 filter 319 receives the packet from switch 303 and subsequently identifies and checks the bandwidth utilization. Layer 2 filter 319 forwards or drops the packet as configured. Layer 3 filter 321 receives the packet from layer 2, extracts information from APDU (application protocol data unit not shown), verifies all IP-based services and the bandwidth utilization based on IP addresses and application protocol, and verifies more detail information within the application protocol (e.g., whether the packet is EtherNet/IP type). Filter 321 is able to extract and check explicit and implicit message types as well as extract and check the CIP (Common Industrial Protocol) service type and check CIP objects types and attributes of the objects. Consequently, filter 321 is able to extract and check at the deepest available level of information from the APDU. Layer 3 filter 321 forwards the packet as configured to layer 7 if the packet is designated for module 211, CPU module 209, or its destination address as configured. Layer 3 filter 321 forwards or drops the packet as configured by control manager 318. Layer 7 component (Application layer) 311 receives the packet from layer 3 through layer 4 and 6 component 309. The packet will be forwarded to application protocol interface 313. A packet typically passes through different layers of filters in order to reach to its destination, consequently prohibiting unauthorized access and creating robust communication between PLC 201 and plant network 203.

Ethernet switch 303 includes ports 229, 225a, 225b, and 227a, 227b, packet filter block 327, and Ethernet switch manager 329. Ports 225a and 225b correspond to port 225 (as shown in FIG. 2) and ports 227a and 227b correspond to port 227 and provide redundancy for enhancing robustness. Ports 229, 225a, 225b, 227a, and 227b are typically associated with OSI layer 2 and are managed by Ethernet switch 303 in order to connect to the physical network of switch 303.

Protection control manager 318 provides an interface with a user through configuration tool 301. With the embodiment shown in FIG. 3, the user enters configuration data through configuration tool 301 to component 318 in order to configure all filters and protection blocks. The user typically configures access control, restricts access to the devices, bandwidth utilization control, application protocol filter at its deepest level, ARP storm protection, packet storm protection, and denial of services (DOS) attack protection. Control manager 318 supports configuration information at the switch layer, layer 2, and layer 3.

Ethernet switch 303 supports port pairs in accordance with Ethernet specifications. Switch 303 typically supports packet filtering and port rate limiting capabilities. Ethernet switch manager 329 is configured by a user through configuration tool 301, which sends configuration information 322 to Ethernet switch manager 329. Packet filter block 327 filters packets at the switch level. With an embodiment, packet filter block 327 is located within switch 303 in order to reduce microprocessor processing time. By filtering packets at an initial level, processing time and resources may be conserved at higher layer processing.

Packet filter block 327 processes packets received through ports 229, 225a, 225b, 227a, and 227b at the Ethernet switch layer. If packet filter block 327 determines that a packet is consistent with configuration data 322, it passes the filtered packets to OSI layer 2 component 305 for further processing by protection block 319 as will be discussed with the flow diagram shown in FIG. 4. If protection block 327 determines that a packet should be dropped in accordance with layer 2 protection configuration information 323, the packet is dropped; otherwise, the packet is passed to OSI layer 3 component 307.

Figure 4:
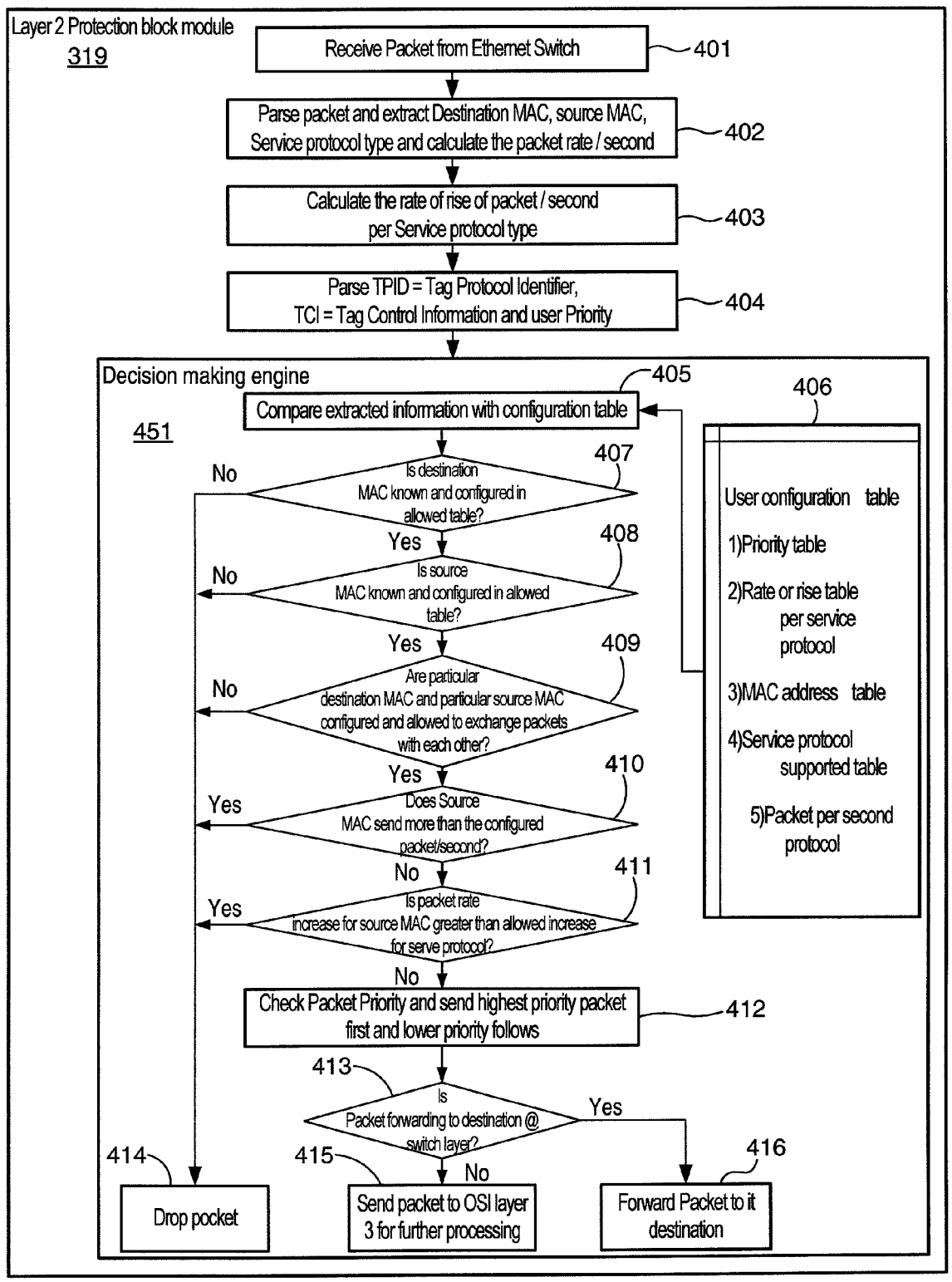
FIG. 4 shows a flow diagram of a protection block operating at an OSI layer 2 according to an embodiment of the invention.

OSI Layer 2 component 305 performs filtering of packets after the switch level. Switch 303 often cannot filter all unwanted packet traffic. Component 305 incorporates protection block 319, which is configured by the user with configuration tool 301 through configuration information 323. Consequently, protection block 319 filters incoming packet traffic as configured. For example, component 305 may provide rate limiting capability by calculating the incoming packet rate and control the flow of the packets. According to an embodiment of the invention, if incoming rate packet rate is higher than allowed by layer configuration information 323, then packets are dropped. Plant network 203 typically has the highest bandwidth available. Operation of component 305 is further discussed with flow diagram 319 as shown in FIG. 4.

OSI Layer 3 component 307 performs the filtering of packets at the IP layer. Protection block 321 identifies the IP information and filters IP packets as configured to allow or refuse access to PLC 201 or plant network devices 213 and 215. Protection block 321 obtains layer 3 configuration information 325 from protection control manager 318. Component 307 also determines the service protocol and passes a packet to the designated destination or drops the packet as configured. This action allows component 307 to grant or reject IP protocol based packet to the intended destination device by forwarding packets when consistent with configuration information 325. Consequently, component 307 provides limited network transparency between control network/office network 205, PLC 201, and plant network 203.

Packets to module services 315 may be processed by OSI Layer 4-6 component 309 and further processed by OSI Layer 7 component 311. Component 311 typically does not offer any filtering and processes packets that may indicate application protocols not limited but including EtherNet/IP, MODBUS TCP, FTP, SNMP, SMTP, NTP and other application protocols) to communication with PLC 209 or module services provided by module 211 or another interface module.

Application protocol interface 313 provides an interface between application protocol 311 and module services 315. Communication interface module services 315 is a software component that provides necessary interface between an application protocol and module services. With an embodiment, component 315 acts a data bridge between application interface 313 and backplane 233. Component 315 extracts the data from application interface 313 and converts the data to make it understandable to CPU module 209 and vice versa. Backplane to module interface 317 provides interface service between backplane 233 and module services 315. Backplane 233 provides an interface between CPU module 209 and other special function modules, e.g., communication module 211. With an embodiment, communication between CPU module 209 and module 211 occurs only through backplane 233. CPU module 209 can be programmed, configured or monitored using Ethernet port 231 or 229.

FIG. 4 shows flow diagram 319 of a protection block operating at an OSI layer 2 according to an embodiment of the invention. Block 319 operates at the media access control (medium access control) (MAC) data communication protocol sub-layer, which is a sub-layer of the data link layer specified in the seven-layer OSI model (layer 2). The MAC sub-layer typically provides addressing and channel access control mechanisms, where a MAC address is associated with a host's link layer (hardware) address. In step 401 protection block 319 receives a packet from Ethernet switch 303. In step 402 protection block 319 parses the packet in order to extract the destination MAC address, source MAC address, and service protocol type. Step 402 further determines the current packet rate that is associated with the extracted source MAC address, destination MAC address, and service protocol type. The packet rate is typically averaged over a predetermined period of time. (Examples of the service protocol type include Address Resolution Protocol (ARP), Point-to-Point Protocol, Reverse Address Resolution Protocol, Data Link Layer, Frame relay, Gateway GPRS Support Node, High-Level Data Link Control, IEEE 802.2, Link Control Protocol, and Media Access Control.) Step 403 may further determine the change of the packet rate for the packet flow.

With embodiments of the invention, step 404 further parses the tag protocol identifier (TPID) and tag control information and user priority (TCI) that may with included when networks 203 and 205 support virtual local area networks (VLANs).

Access information from steps 401-404 are subsequently processed by decision engine 451 based on configuration information 406 corresponding to layer 3 configuration information 323 from protection control manager 318 as shown in FIG. 3. Steps 405 and 407 and 416 are performed in accordance with configuration data 406. Configuration information 406 may be based on the service protocol and/or MAC addresses.

With an embodiment, as shown in FIG. 4, layer 2 configuration data 406 includes a priority table, predetermined thresholds of packet flow traffic activity (e.g., maximum rate and rate of rise), and supported service protocols. Configuration data 406 is typically predicated on the MAC source and destination addresses.

The extracted destination MAC destination and source address are compared with allowed MAC address pairs contained in steps 407-409. If the address pair is not allowed, the packet is dropped in step 414. Otherwise, the extracted data is processed by steps 410-411 to determine whether the packet flow activity level (e.g., packet rate and packet rate increase at the time that the packet is received) exceeds the configured limits (e.g., a predetermined threshold) specified in configuration information 406. If so, the packet is dropped in step 414.

In step 412, packets are sent in accordance with the priority level (corresponding to TCI) if packets are queued. If the packet is being forwarded at the switch layer, as determined by step 413, the packet is forwarded to the designated MAC address in step 416. For example, packets associated with some services, e.g., Address Resolution Protocol (ARP), Internet Control Message Protocol (ICMP), and Real Time Streaming Protocol (RSTP) are not processed at layer 3. Otherwise, the packet is further processed by protection block 321 (as shown in FIG. 5) at OSI layer 3 at step 415.

Figure 5:
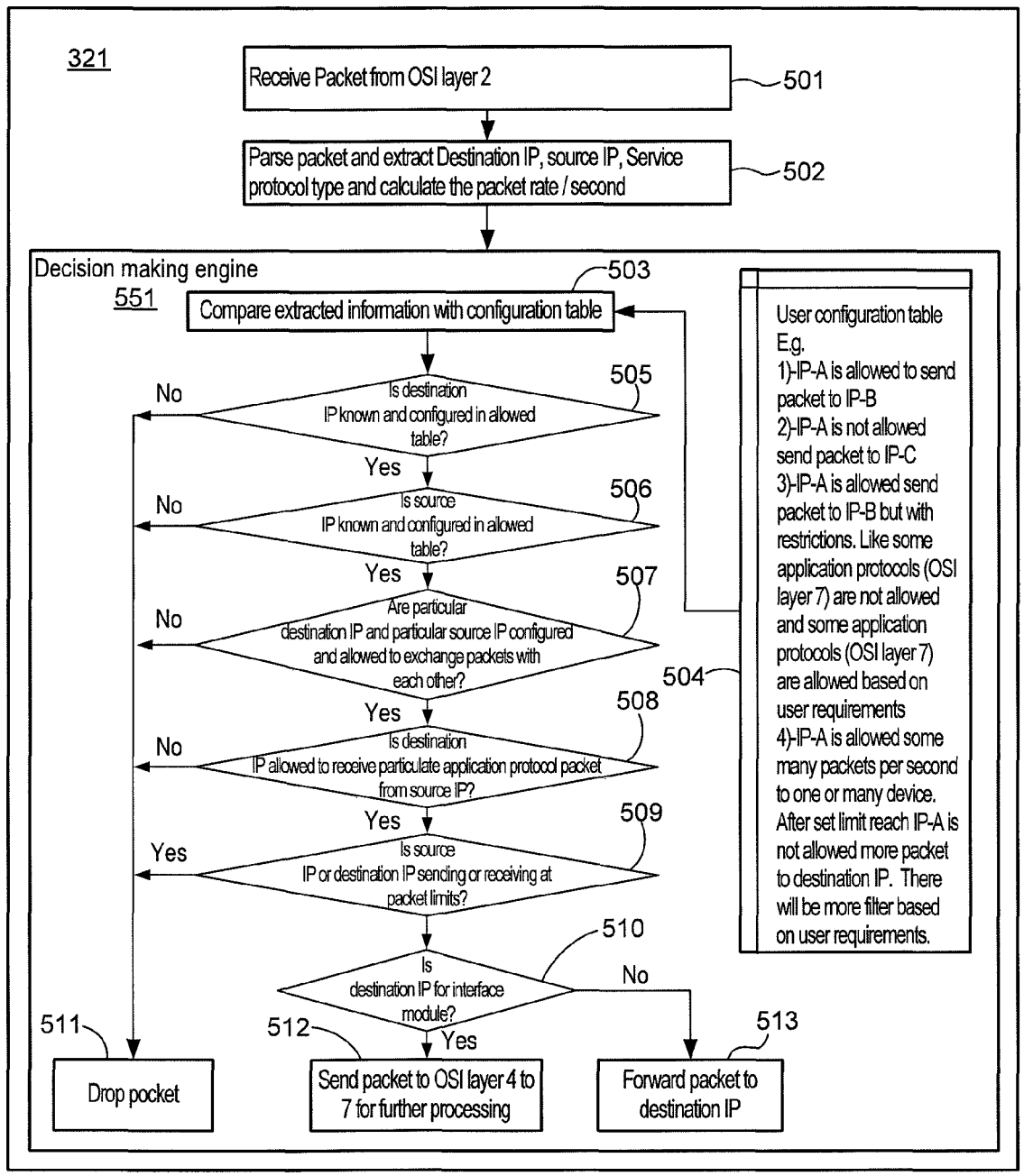
FIG. 5 shows a flow diagram of a protection block operating at an OSI layer 3 according to an embodiment of the invention.

FIG. 5 shows flow diagram 321 of a protection block operating at an OSI layer 3 according to an embodiment of the invention. Step 501 receives the packet from protection block 415 when block 415 determines that the packet should be further processed at layer 3. The destination IP address, source IP address, and service protocol type (application protocol typically contained in a packet field at layer 3) is extracted from the packet in step 502. Step 502 further determines the current packet rate of the packet flow that contains the packet.

The extracted information from the packet is processed by decision engine 551 in accordance with layer 3 configuration information 504 corresponding to configuration information 325 of protection control manager 318 as shown in FIG. 318. Steps 505-507 determine whether the destination IP and source IP address pair are allowable. If not, the packet is dropped in step 511. Otherwise, the packet is further processed by step 508 to determine if the packet is associated with an allowed application protocol type between the destination IP address and the source IP address. If the not, the packet is dropped in step 511.

Step 509 further determines if the current packet traffic activity level is in accordance with configuration information 504. If not, the packet is dropped in step 511. Otherwise, step 510 determines whether the packet should be further processed at OSI layers 4-7 (corresponding to component 309 as shown in FIG. 3) through step 512. For example, the packet may be associated with services supported by module services 315 (as identified by IP destination address), where the packet is further processed by OSI layer 7 application component 311. However, packets associated with other services not supported by communication module 211 may be passed to the destination IP address through a port on Ethernet switch 303 by step 513.

With an embodiment, as shown in FIG. 5, layer 3 configuration data 406 includes a mapping between allowed IP source addresses and IP destination addresses and packet flow traffic activity limits that may depend on the type of application service.

As described above, communication module 211 offers robust Ethernet communication between PLC 201 and plant network 203 by controlling communication with control/office network 205. To access PLC 201 and plant network 203, control network/office network devices 217 and 219 communicate through module 11. This network topology provides network isolation between plant network 203 and control network/office network 205.

Module 211 has an integrated manageable Ethernet switch (switch 303). The integrated switch creates a physical and logical isolation between plant network 203 and control network/office network 205 within module 211. This isolation provides data and automation operation protection to plant network 203 against unauthorized data and operation access.

With embodiments of invention, module 211 provides configurable communication transparency between plant network 203 and control/office network 205 for intended communication for plant monitoring, supervisory control and other industrial automation intended activities. Module 211 provides resource exhaustion protection caused by packets storm. This may increase the efficiency module 211 and significantly increase the probability of intended packet delivery. Module 211 can also protect against a denial of service (DOS) and ARP storm and also filter a broadcast and protect against broadcast storm.

Module 211 also supports an integrated user configurable OSI layer 3 filter capability (corresponding to protection block 321). The layer 3 filter capability may filter the application protocol and may further filter, within the application protocol, a service parameter.

Module 211 can be configured to provide IP filtering through protection control module 318. Devices on control network/office network 205 can access PLC 201 and devices on plant network 203 only as configured. Devices on the control network/office network 205 can send/receive EtherNet/IP request responses from PLC 201 and devices on plant network 203 only as configured. Furthermore, devices on the control network/office network 205 can send/receive EtherNet/IP different service request responses from PLC 201 and devices on plant network 203 only as configured. Devices on control network/office network 205 can send/receive packets associated with application layer 7 services and industrial fieldbus protocols (e.g., EtherNet/IP, MODBUS TCP, HTTP, FTP, SMTP, NTP, SNMP and other application services) from PLC 201 and devices on plant network 203 only as configured.

Module 211 also supports bandwidth utilization based on network services and industrial fieldbus protocols (e.g., FTP and EtherNet/IP). This capability may prevent overloading of plant network 203 and PLC 201. Device 217 on control network/office network 205 can send a configured number of packets per second to PLC 201 and devices 213 and 215 on plant network 205. If device 217 sends at a packet rate greater than a configured packet per second, module 211 drops the extra received packets.

Module 211 also supports point-to-point communication between plant network devices 213 and 215 and control network/office network devices 213 and 215 as configured. Module 211 provides access protection against unauthorized data access from control network/office network 205 to plant network 203.

Figure 6:
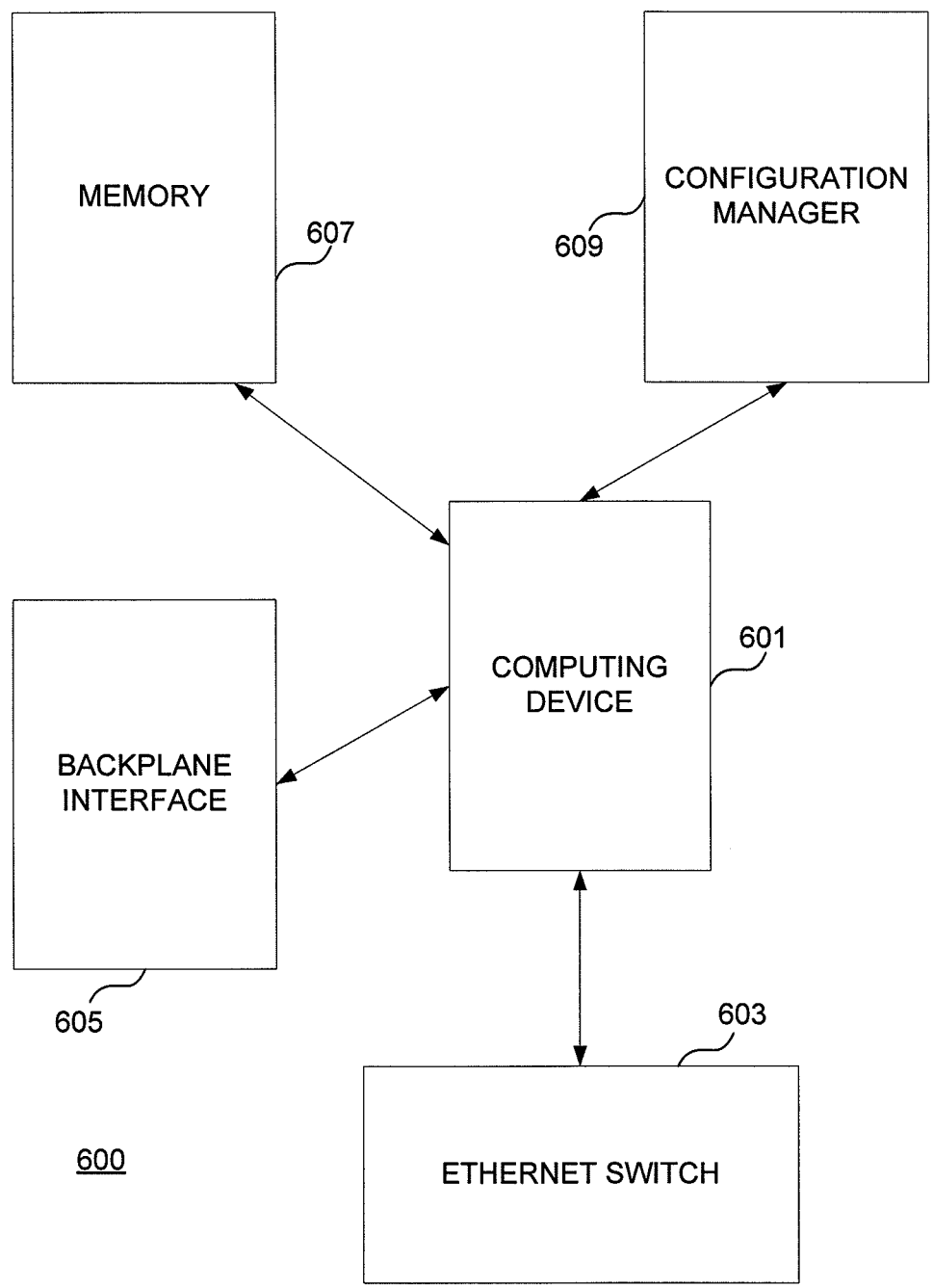
FIG. 6 shows a block diagram of a communication module according to an embodiment of the invention.

FIG. 6 shows block diagram 600 of communication module 211 according to an embodiment of the invention. Computing device 601 executes processes 319 and 321 on a packet received through Ethernet switch 603. Both processes 319 and 321 perform filtering of packets at layer 2 and layer 3, respectively, in accordance with configuration information obtained from configuration manager 609. A processed packet is either dropped or forwarded to the designated destination through either backplane interface or Ethernet switch 603 based on the application.

Embodiments of the invention may include forms of computer-readable media. Computer-readable media include any available media that can be accessed by a computing device 601 from memory 607. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, one of ordinary skill in the art will appreciate that various aspects described herein may be embodied as a method, a data processing system, or as a computer-readable medium storing computer-executable instructions. For example, a computer-readable medium storing instructions to cause a processor to perform steps of a method in accordance with aspects of the invention is contemplated. Aspects of the method steps disclosed herein may be executed on a processor on computing device 601. Such a processor may execute computer-executable instructions stored on a computer-readable medium.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

I claim:

1. An interface module in a programmable logic controller (PLC) comprising:
    an Ethernet switch;
    a first port electrically coupled to a CPU module of the PLC and to the Ethernet switch;
    a second port electrically coupled to a plant network and the Ethernet switch;
    a third port electrically coupled to a control office network and the Ethernet switch; and
    a processor configured to control communication to the PLC and the plant network from the control office network by:
        extracting a valid source media access control (MAC) address, a valid destination MAC address, and a service protocol type from a packet, wherein the valid source MAC address and the valid destination MAC address are included in a subset of predetermined addresses;
        determining a layer 2 packet activity level;
        determining whether to pass the packet for further processing at layer 3 based on layer 2 configuration information, the extracted valid MAC addresses and extracted service protocol type, and the determined layer 2 packet activity level;
        when the packet is processed at layer 3, extracting a valid IP source address, a valid IP destination address, and a valid application services indicator from the packet;
        determining a layer 3 packet activity level;
        determining whether to pass the packet based on layer 3 configuration information, the extracted valid IP addresses and the extracted valid application services indicator at a deepest level of information, and the determined layer 3 packet activity level, wherein the packet is either forwarded to the valid IP destination address through one of the ports or sent to higher layer processing when the valid destination IP address corresponds to the interface module; and
        filtering as configured at a deepest level of an application protocol.

2. The interface module of claim 1, further comprising:
    a configuration manager configured to provide the configuration information.

3. The interface module of claim 1, wherein the processor is configured to pass the packet to the valid destination address only when the configuration information indicates that the packet is allowed for the valid source address and the valid destination address contained in the packet.

4. The interface module of claim 3, wherein the processor is configured to pass the packet only when the configuration information further indicates that a service protocol type associated with the packet is allowed.

5. The interface module of claim 1, wherein the processor is configured to pass the packet to the valid destination address only when the configuration information indicates that packet activity level is below a predetermined packet threshold for a service.

6. The interface module of claim 1, wherein the processor processes the packet at layer 2 to determine whether to pass the packet.

7. The interface module of claim 1, wherein the processor processes the packet at layer 3 to determine whether to pass the packet.

8. The interface module of claim 7, wherein the processor is further configured to send the packet for further processing at a higher layer when the valid IP destination address of the packet corresponds to the interface module.

9. The interface module of claim 8, wherein the processor is further configured to forward the packet through the Ethernet switch to the IP destination address when the IP destination address does not correspond to the interface module.

10. The interface module of claim 1, wherein the processor is further configured to:
map a plurality of predetermined packet flow traffic activity limits to a plurality of valid address pairs, wherein one of the valid address pairs includes the valid source address and the valid destination address; and
pass the packet to the valid destination address from the valid source address responsive to a packet traffic activity level being below the predetermined packet flow traffic activity limit for a corresponding one of the valid address pairs.

11. The interface module of claim 10, wherein the packet flow traffic activity limit comprises an increase of a packet rate.

12. The interface module of claim 10, wherein the processor is further configured to:
drop the packet when the predetermined packet flow traffic activity limit is reached either for the valid source address or the valid destination address.

* * * * *